(12) United States Patent
Kim et al.

(10) Patent No.: US 8,225,336 B2
(45) Date of Patent: Jul. 17, 2012

(54) METHOD AND SYSTEM OF CONFIGURING A VIRTUAL DEVICE

(75) Inventors: Su Myeon Kim, Yongin-si (KR); Hun Lim, Yongin-si (KR); Jin Wook Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1133 days.

(21) Appl. No.: 11/826,033

(22) Filed: Jul. 11, 2007

(65) Prior Publication Data

US 2008/0077713 A1    Mar. 27, 2008

(30) Foreign Application Priority Data

Sep. 25, 2006 (KR) .................... 10-2006-0092859

(51) Int. Cl.
*G06F 3/00* (2006.01)
*G06F 9/44* (2006.01)
*G06F 9/46* (2006.01)
*G06F 13/00* (2006.01)

(52) U.S. Cl. ....................................................... 719/324

(58) Field of Classification Search .................. 719/324
See application file for complete search history.

(56) References Cited

U.S. PATENT DOCUMENTS

| | | | |
|---|---|---|---|
| 5,732,282 A * | 3/1998 | Provino et al. ............... 719/324 |
| 5,982,614 A | 11/1999 | Reid | |
| 6,233,611 B1 * | 5/2001 | Ludtke et al. ................ 709/223 |
| 6,553,223 B1 * | 4/2003 | Bayley et al. ................ 455/419 |
| 2005/0132366 A1 * | 6/2005 | Weast ............................. 718/1 |
| 2005/0281417 A1 | 12/2005 | Toprover | |

FOREIGN PATENT DOCUMENTS

| | | |
|---|---|---|
| JP | 2003-284166 | 10/2003 |
| KR | 1020000030928 | 6/2000 |
| KR | 1020020074010 | 9/2002 |
| KR | 1020040004307 | 1/2004 |
| KR | 1020040013458 | 2/2004 |
| KR | 1020040032241 | 4/2004 |
| KR | 1020040088862 | 10/2004 |
| KR | 1020050052119 | 6/2005 |

* cited by examiner

*Primary Examiner* — Emerson Puente
*Assistant Examiner* — Kimbleann Verdi
(74) *Attorney, Agent, or Firm* — NSIP Law

(57) ABSTRACT

A method of configuring a virtual device and a system of configuring a virtual device is provided. A plurality of virtual device drivers corresponding to a plurality of specific functions of a first device is identified along with a second device. A plurality of virtual device drivers corresponding to the plurality of specific functions of the second device is also identified. A plurality of virtual device drivers required for a service is selected from the plurality of virtual device drivers corresponding to the plurality of specific functions of the first device and the plurality of virtual device drivers corresponding to the plurality of specific functions of the second device. The virtual device is configured with the plurality of virtual device drivers required for the service.

13 Claims, 13 Drawing Sheets

1260

METHOD AND SYSTEM OF CONFIGURING A VIRTUAL DEVICE

CROSS-REFERENCE TO RELATED APPLICATION

This application claims the benefit under 35 U.S.C. §119(a) of a Korean Patent Application No. 10-2006-0092859, filed on Sep. 25, 2006, in the Korean Intellectual Property Office, the entire disclosure of which is hereby incorporated by reference.

BACKGROUND OF THE INVENTION

1. Field of the Invention

The present invention relates to a method of configuring a virtual device. More particularly, the present invention relates to a method of configuring a virtual device by combining a plurality of specific functions selected from the plurality of specific functions of each of at least two devices, and a system of configuring a virtual device.

2. Description of Related Art

The recent appearance of diverse electronic devices is due to a rapid development of information technology. Electronic devices have become a necessity in our daily lives and have changed our lifestyles. Most users generally have at least one electronic device. The maturity of the portable device market and the popularity of technology usage have resulted in portable electronic devices which have diverse functions. Therefore, a customer's needs are diversified. Also, as a need for being information-oriented increases, appearance of portable devices using more diverse functions also increases. Mobile terminals, Moving Picture Experts Group Audio Layer 3 (MP3) players, portable multimedia players (PMP), ultra mobile PCs (UMPC), and car navigation systems, among others are examples of portable devices.

When users have at least two electronic devices and use them both, there may be a waste of resources since the electronic devices have many similarities in configurations. For example, the electronic devices include a similar configuration such as an input unit receiving a user's input, a processor processing a received input, and an output unit providing the user with a processed result, among others. The similar configuration is more apparent in a PMP, a mobile terminal, and a notebook, among others, corresponding to the portable device than any other electronic device. Similar configurations of the electronic devices may be apparent since they include an input unit including a keypad, a keyboard, or a touchpad among others; an output unit including a speaker, an earphone, or a display outputting a voice/image among others; and a processor unit including a processor, a memory, or a storage unit among others, and the like.

In some instances, the resources of the user's electronic device which are similar to those of the user's other electronic device may not be used and may be wasted. Since the electronic devices may be applied to only an original use of the electronic devices, the needs of a user may not be satisfied, even though the user clearly has the sufficient resources of the electronic devices For example, even though the user has a mobile terminal and a notebook and may hold a video conference by using a digital camera loaded in the mobile terminal and the notebook, a service for holding the video conference via one of the electronic devices is not currently provided. Also, when the user outputs image contents via a display device of the mobile terminal, or makes a user's input by using a keypad, the user is inconvenienced by being required to output the image contents via the small display device of the mobile terminal despite having a large display screen of the user-owned notebook, and by being forced to perform an input using the small keypad.

The problem may be partially solved with a universal play and plug (UPnP), such as a conventional and standard technology supporting a connection between the electronic devices. According to a UPnP standard, electronic devices such as a printer, a scanner, and a personal digital assistant (PDA), among others may connect with a network, and be used to eliminate a need for the user's establishment. FIG. 1 is a configuration diagram illustrating an interface between devices according to conventional art. Diverse device types may have functions similar to each other. However, when a device A including four specific functions connects with a device B including three specific functions via the network, an inconvenience in the mutual connection according to the UPnP standard technology is created. A significantly complex process detecting a newly-connected device and analyzing a profile about the specific function that the device provides is also required. A PictBridge standard is also proposed in another form. However, the PictBridge standard may move images by the standard between the device generating the image and the device using the image, and only the devices related to the image may be applied.

Accordingly, there is a need for an improved system and method for configuring a virtual device.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method of configuring a virtual device. The method includes identifying a plurality of virtual device drivers corresponding to a plurality of specific functions of a first device, respectively, identifying a second device, identifying a plurality of virtual device drivers corresponding to the plurality of specific functions of the second device, respectively, selecting a plurality of virtual device drivers required for a service, from the plurality of virtual device drivers corresponding to the plurality of specific functions of the first device and the plurality of virtual device drivers corresponding to the plurality of specific functions of the second device, and configuring the virtual device with the plurality of virtual device drivers required for the service. According to an exemplary implementation, each of the plurality of virtual device drivers may include at least one common information format which is used for respectively implementing the plurality of specific functions. According to another exemplary implementation, each of the plurality of virtual device drivers corresponds to at least one of a source function type and a sink function type.

An aspect of exemplary embodiments of the present invention also provides a system of configuring a virtual device. The system includes a first driver identifier, a device identifier, a second driver identifier, a service driver selector and a virtual device configurator. The first driver identifier identifies a plurality of virtual device drivers corresponding to a plurality of specific functions of a first device, respectively. The device identifier identifies a second device. The second driver identifier identifies a plurality of virtual device drivers corresponding to a plurality of specific functions of the second device, respectively. The service driver selector selects a plurality of virtual device drivers required for a service, from the plurality of virtual device drivers corresponding to the plurality of specific functions of the first device and the plurality of virtual device drivers corresponding to the plurality of specific functions of the second device. The virtual device configurator configures the virtual device with the plurality of virtual device drivers required for the service.

An aspect of exemplary embodiments of the present invention also provides a virtual device platform. The virtual device platform includes a virtual device adapter that generates a plurality of virtual device drivers corresponding to a plurality of specific functions of a device, respectively. The virtual device adapter also provides information of the generated plurality of virtual device drivers. A virtual device middleware controls an access of the plurality of specific functions of the device, and an operation of a virtual device, based on information of the plurality of virtual device drivers and information of the device.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
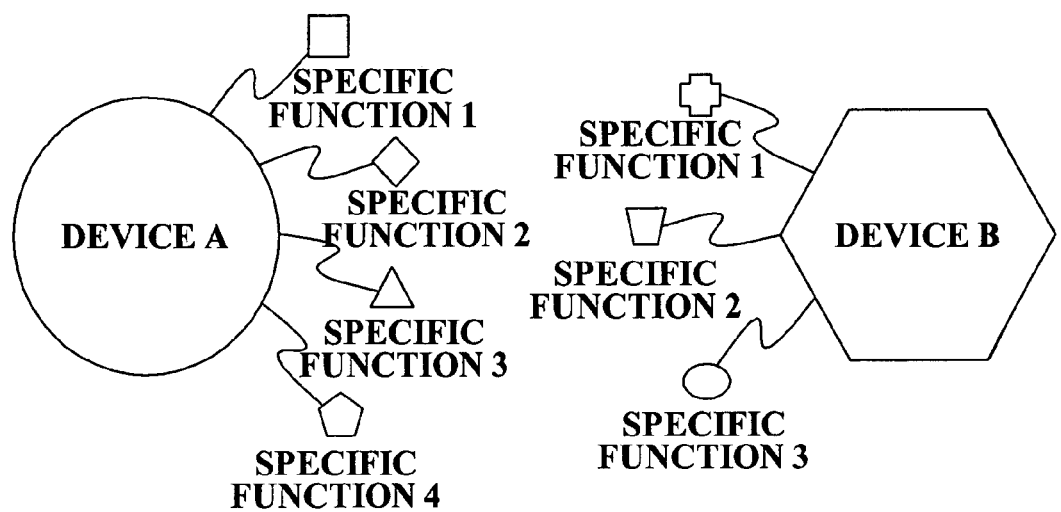
FIG. 1 is a configuration diagram illustrating an interface between devices according to conventional art.
Figure 2:
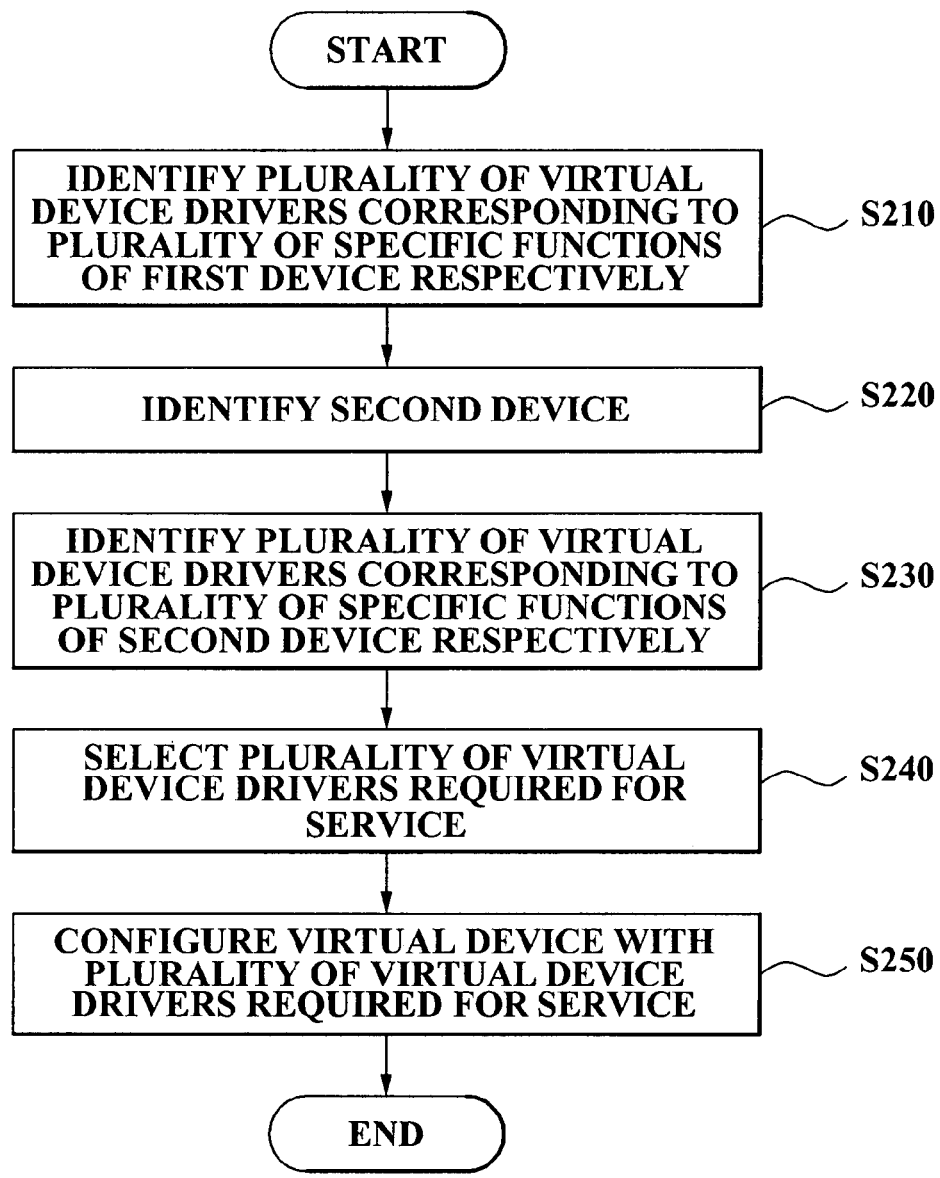
FIG. 2 is a flowchart illustrating a method of configuring a virtual device (VD) according to an exemplary embodiment of the present invention.

FIG. 2 is a flowchart illustrating a method of configuring a virtual device (VD) according to an exemplary embodiment of the present invention.

Referring to FIG. 2, a method of configuring a VD identifies a plurality of virtual device drivers (VDDs) corresponding to a plurality of specific functions of a first device respectively (S210). The plurality of specific functions of the first device is divided into the plurality of specific functions based on the type of contents processed in a device. For example, the plurality of specific functions may be divided into a type of contents such as a video, an audio, a text, a pointing, storage, a network, and the like. The plurality of VDDs may correspond to each of the plurality of specific functions that is divided, and may provide an interface with each of the plurality of specific functions of the device.

As an example, the plurality of VDDs may include at least one information format which is used for respectively implementing the plurality of specific functions. For example, the plurality of VDDs may include a bitmap (BMP) format, and a Joint Photographic Experts Group (JPG) format, among others as an information format used in implementing the plurality of specific functions, such as image formats, a Waveform audio (WAV) format, a pulse-code modulation (PCM) format, and the like as the information format used in implementing an audio. The plurality of specific functions of the device, according to implementation of the VD configured, may be operated by using the information format.

Each of the plurality of VDDs may correspond to at least one of a source function type and a sink function type.

According to an exemplary implementation, the method of configuring the VD identifies a second device (S220). The first device and the second device of the present invention may include at least one communication module. The communication modules may include at least one of a wireless communication module such as a Zigbee module, a Bluetooth module, a wireless local area network (WLAN) module, a wireless broadband internet (WiBro) module, a code division multiple access (CDMA) module a wired communication module such as an Ethernet module, and an Institute of Electrical and Electronics Engineers (IEEE) 1.394 module among others. According to an exemplary implementation, the method of configuring the VD may transmit a device search query to a corresponding area in a broadcast method to identify all second devices located in the corresponding area via the communication module, and to identify the second device by receiving a response signal from the second device located in the corresponding area.

Also, the method of configuring the VD identifies a plurality of VDDs corresponding to the plurality of specific functions of the second device respectively (S230). The plurality of specific functions of the second device is divided into the plurality of specific functions according to the type of contents processed in the second device similar to the plurality of specific functions of the first device.

Also, the method of configuring the VD selects a plurality of VDDs required for a service, from the plurality of VDDs corresponding to the plurality of specific functions of the first device and the plurality of VDDs corresponding to the plurality of specific functions of the second device (S240). According to an exemplary implementation, the method of configuring the VD by selecting the plurality of VDDs required for the user's desired service from the plurality of VDDs corresponding to the plurality of specific functions of the first device and the plurality of VDDs corresponding to the plurality of specific functions of the second device. The method of configuring the VD may also provide a message informing the user of an overlapping input when the VDD input by the user is overlapping.

As another example of step S240, the method of configuring the VD may select the plurality of VDDs required for the service according to a user's usage pattern record. The user's usage pattern record may correspond to a pattern record about the VD required for the service that the user previously selected and configured.

According to an exemplary implementation, the method of configuring the VD may select the plurality of VDDs corresponding to the VD generally configured according to the usage pattern record.

According to an exemplary embodiment of the present invention, the method of configuring the VD may select the plurality of VDDs by providing the user with a pattern list according to the usage pattern record, and the user inputting any one of pattern lists.

The method of configuring the VD configures the VD with the plurality of VDDs required for the service (S250). For example, the method of configuring the VD may transmit a query requiring a response concerning whether the VD may be configured with the device corresponding to each of the selected plurality of VDDs, receive an answer message from the device corresponding to each of the selected plurality of VDDs, and thereby configure the VD with the plurality of VDDs required for the service.

According to an exemplary embodiment of the present invention, a VDD may be detected where an error occurs when the error occurs while implementing the service using the VD. For example, status information regarding the plurality of VDDs may be verified at predetermined intervals and the VDD may be detected where the error occurs with reference to the status information. Also, as another example, the method of configuring the VD may receive the status information from a device corresponding to each of the plurality of VDDs at predetermined intervals, and detect the VDD where the error occurs with reference to the status information. In this instance, the method of configuring the VD may provide the user with the status information about the VD implementing the service by using the status information.

Configuring the VD may comprise reconfiguring the VD with another VDD to replace a specific function corresponding to the detected VDD where the error occurs. For example, the specific function corresponding to the VDD where the error occurs corresponds to a display device of a notebook. The method of configuring the VD may reconfigure the VD by replacing the VDD corresponding to the display device of the notebook with the VDD corresponding to the display device of a digital television.

Figure 3:
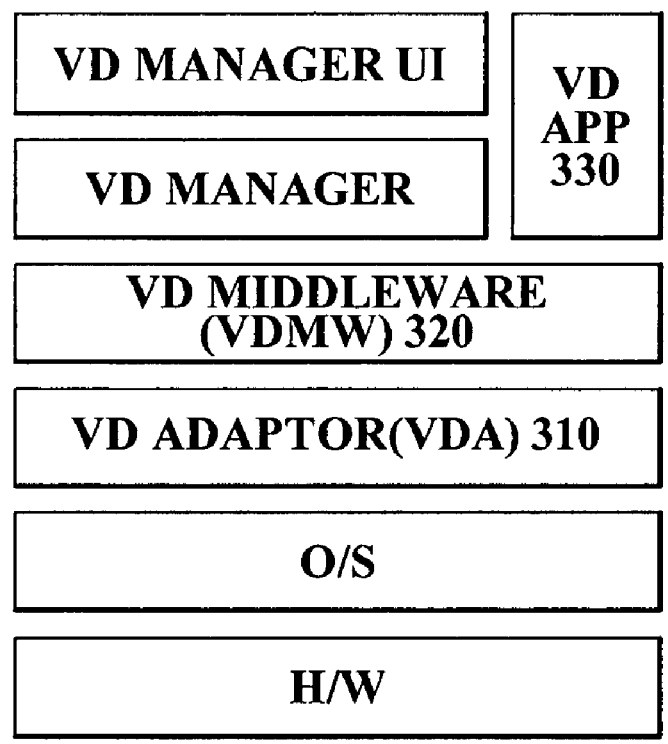
FIG. 3 is a structure diagram illustrating an example of a stack in platform software supporting a method of configuring a VD of FIG. 2.

FIG. 3 is a structure diagram illustrating a stack in platform software supporting a method of configuring a VD illustrated in FIG. 2.

Referring to FIG. 3, the stack in the platform software supporting the method of configuring the VD is made of three layers. The three layers consist of a VD adapter (VDA) 310 layer, a VD middleware (VDMW) 320 layer and a VD application (VDApp) 330 layer. The VDA 310 may include modules dependant on hardware and an operating system (O/S), and the VDA 310 is described in detail as follows. The VDMW 320 manages the specific function of the device which is implemented on the VDA 310. According to an exemplary implementation, the VDMW 320 may include modules dependant on hardware and an O/S. The VDApp 330 may detect the specific function provided from each of the plurality of devices and thereby implements an operation such as configuring, managing, and deleting the VD, among others. Also, the VDApp 330 on demand may be divided into two layers comprising a VD manager (VDM) and a VD manager user interface (VDMUI). The VDM may implement the operation such as a generation, an application, and a stop of the VD, among others, and the VDMUI may provide a user interface for the VDM.

Figure 4:
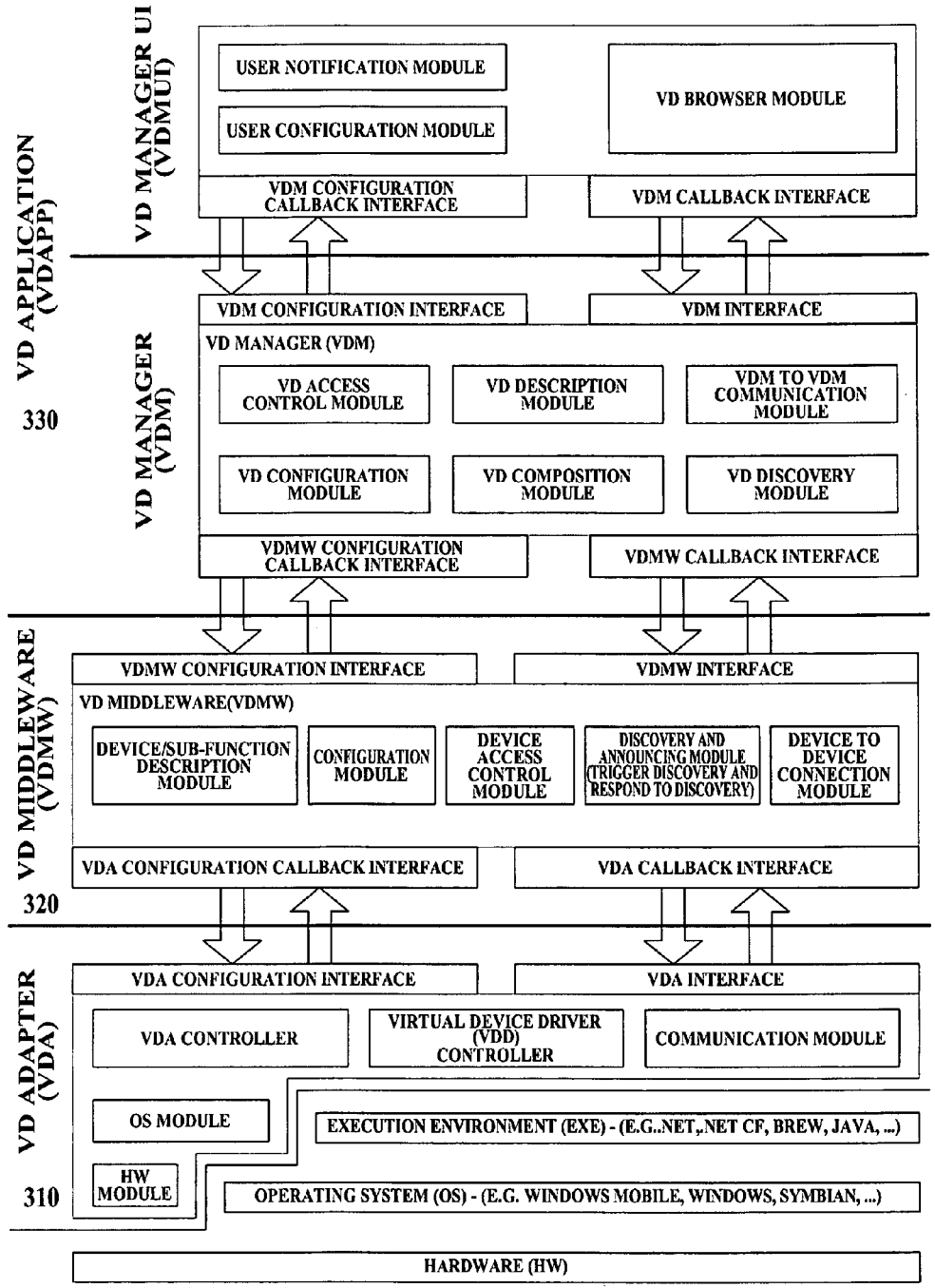
FIG. 4 is a detailed diagram illustrating an example of a stack in platform software supporting a method of configuring a VD of FIG. 2.

FIG. 4 is a detailed diagram illustrating a stack in platform software which supports a method of configuring a VD of FIG. 2.

In FIG. 4, each layer is made of a plurality of components and a communication between each layer is made via an interface. For example, the simple interface is the interface that supports an enabling of a higher layer to use a function of a lower layer. Also, a configuration interface is the interface for setting an environment of the lower layer by the higher layer. The interface is referred to as a "callback", and indicates that the interface facilitates the lower layer's use of the function of the higher layer.

A VDA 310 layer may include a hardware (H/W) module, an operating system (O/S) module, a VDA controller, a VDD controller and a communication module. The VDA controller controls a plurality of modules in the VDA 310 layer. The VDD controller is a module accessing and controlling the specific function of the device and includes the VDD corresponding to the specific function of the device. Also, the VDD provides the interface with the specific function of the device. The above communication module implements the communication between a plurality of devices for transmitting and receiving information required for the operation of the VD. The VDA 310 layer provides, for a VDMW 320 layer, information of a plurality of VDDs in the device.

A VDMW 320 layer may include a device/sub-function description module, a configuration module, a device access control module, a discovery and announcing module, and a device-to-device module.

The VDMW 320 layer corresponds to a layer that finds and controls the VDD which represents the specific function of the device. The VDMW 320 layer performs a function, such as a proxy between the VDA 310 layer and the VDM layer, manages a connection between a plurality of devices, and thereby implements a communication between different VD platform instances.

The device/sub-function description module stores and manages the information about the specific function of the device provided in the VDA 310 layer, and the device. The device/sub-function description module is specified using an extensible markup language (XML), and includes general meta information of the device and the specific function. The general meta information includes information of a device level such as a vendor, a device type, and an O/S type among others, a type of the specific function, a name, a support data format, and others. The configuration module provides an environment setting of the VDMW. The device access control module controls access to the specific function of the device, and controls the operation of the VD according to service information of the VD. For example, a personal device controls an external access and an external usage, and controls an access required for the operation of the VD. The discovery and announcing module verifies an existence of the device, announces the existence to the VDM at predetermined intervals, or responds according to the VDM's request. The device-to-device module controls the operation between the devices while the VD is operated.

The VDM layer may include a VD access control module, a VD configuration module, a VD description module, a VD composition module, a VDM-to-VDM communication module, and a VD discovery module as a server of a lower level of the VDApp 330 layer. The VDM layer does not correspond to a layer which should be essentially installed in all devices, and corresponds to a layer required for a device which generates and manages the VD.

The VD access control module implements the function controlling the access in relation to the access control module of the low layer. The VD configuration module provides the function to forcefully execute the environment setting of the VDM layer and the environment setting of the VDMW. The VD configuration module manages different attributes of the VDM layer, and provides appropriate interfaces for updating a configuration. Specifically, a user may control an operation of the VDM layer by using the VD configuration module. The VD description module offers the information about the VD and the VD appropriate for a status, for the user's convenience. The VD composition module plays a role of storing an accessible device, the specific function of the device, and a VD user pattern of the user. Also, the VD composition module may configure a new VD based on the information. The VDM-to-VDM communication module governs the communication between a plurality of VDMs when there is the plurality of VDMs. The VD discovery module distinguishes the device in the corresponding area and identifies the status of a distinguished device.

The VDMUI layer is an interface layer equivalent to the VDM, and may include a user notification module, a user configuration module, and a VD browser module. The user notification module informs the user of an event generated from a plurality of lower layers. According to an exemplary implementation, the user notification module may provide the user interface in diverse output forms such as a display, a sound, and a vibration, among others. The user configuration module provides the user with the user interface for the environment setting of the plurality of lower layers. The VD browser module provides the user with the user interface that facilitates the VDM's ability to read and operate the plurality of specific functions of the devices, and a currently operating plurality of VDs. Also, the VDApp 330 layer may include a service runner component required for operating the VD itself.

Figure 5:
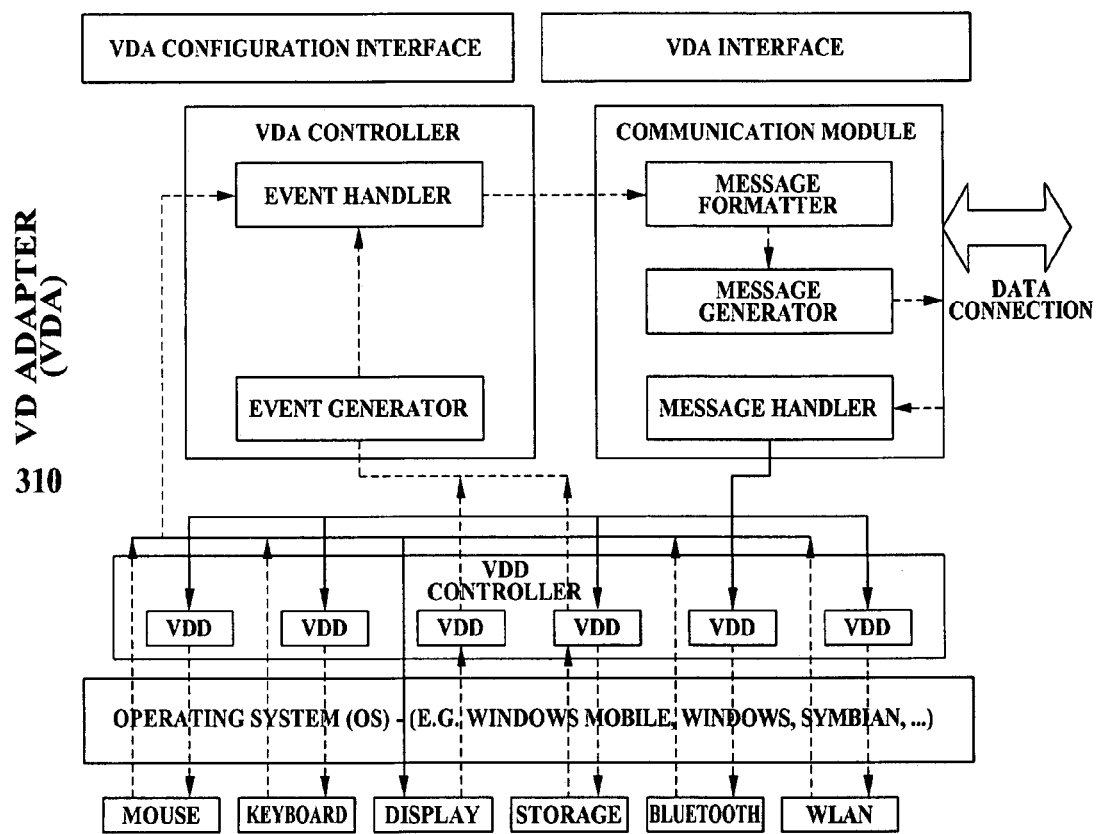
FIG. 5 is a detailed structure diagram illustrating an example of a VD adapter (VDA) of FIG. 4.

FIG. 5 is a detailed structure diagram illustrating a VD adapter (VDA) of FIG. 4.

Referring to FIG. 5, the H/W module and the O/S module included in the VDA 310 are not illustrated. The VDD is operated corresponding to each of a plurality of specific functions, and in control of an interface with each of the plurality of specific functions. The VDD controller is a control module of the VDD. The VDA controller controls the operation of the total VDA based on a plurality of events provided by the VDD. The VDA controller simultaneously analyzes event information received from another device, and thereby transmits event information to the corresponding VDD.

The VDA controller may include an event handler and an event generator. The event generator observes a hardware component, and generates a software event when the hardware component generates an event. For example, the event generator observes hardware components such as monitors and disk drives corresponding to passive data processors which cannot generate hardware events, and generates the software event when the event is generated.

The event handler receives event data output from the VDDs, or software events generated by the event generator, and outputs the event data or the software events to a message formatter. According to an exemplary implementation, the event data corresponds to data in which the hardware event monitored by the VDD is converted by the VDD.

The communication module implements operations such as changing the event information into a message for external communications and changing the received message into the event information. The communication module may include the message formatter, a message generator, and a message handler. The message generates a message format so that the event data received from the event handler, or the software event, may implement a communication with an external device. The message generator generates an event message, based on the message format generated by the message formatter, and transmits the event message to the external device. The message handler receives the event message received from the external device, and transmits the event of the event message to the corresponding VDD.

Figure 6:
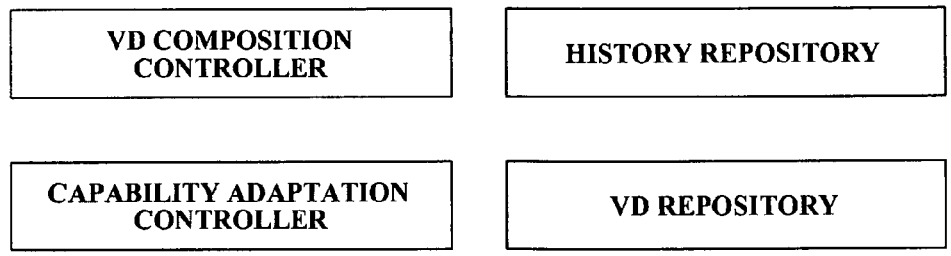
FIG. 6 is a detailed structure diagram illustrating an example of a VD composition module in a VD manager (VDM) of FIG. 4.

FIG. 6 is a detailed structure diagram illustrating an example of the VD composition module in the VDM of FIG. 4.

Referring to FIG. 6, the VD composition module may include a VD composition controller, a history repository, a capability adaptation controller, and a VD repository.

The VD composition controller provides a function of controlling existing VDs. The VD composition controller uses interfaces provided by the VDMW layer to activate or inactivate VD compositions.

The capability adaptation controller matches at least two device functions of a composition selected to configure the VD. Specifically, the capability adaptation controller controls capability and provides information thereof for the VD composition controller when capabilities of the selected device functions are different.

The VD repository corresponds to a database included in the VD composition module, and stores lists of the VD descriptions that have been discovered. The VD composition controller may configure the VD, based on the lists of the VD descriptions stored in the VD repository.

The history repository corresponds to another database included in the VD composition module, and stores information of the VDs configured by the user. The VD composition controller may configure the new VD, based on the information of the configured VDs stored in the history repository.

Figure 7:
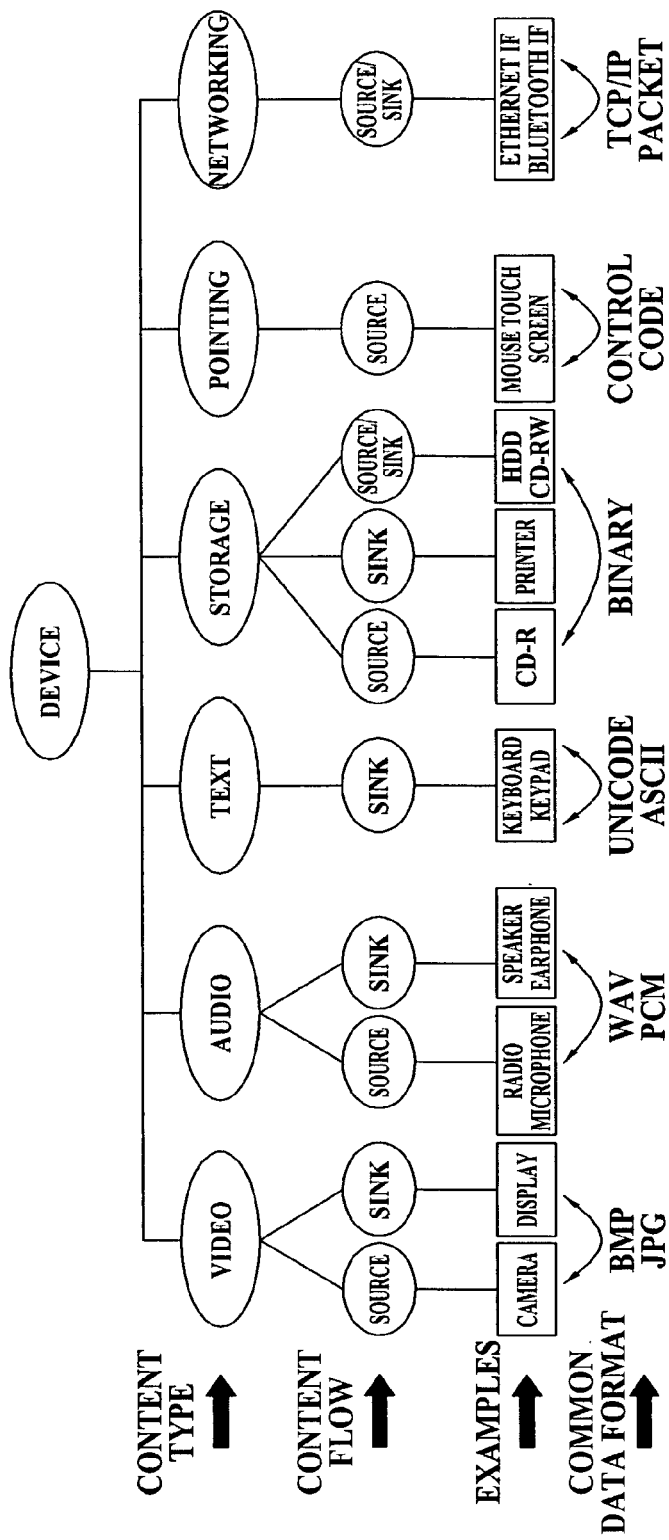
FIG. 7 is a diagram illustrating an exemplary embodiment to describe a virtual device driver (VDD) corresponding to a specific function of a device of FIG. 2.

FIG. 7 is a diagram illustrating an exemplary embodiment of the present invention to describe a VDD corresponding to a specific function of a device illustrated in FIG. 2.

Referring to FIG. 7, certain functions of the device may be classified according to a type of contents capable of being processed. The function of the device may also be classified into the type of contents such as a video content, an audio content, text content, a pointing content, storage content, and a networking content. The plurality of VDDs of the specific function may be classified again according to at least one grouping of a source function type, a sink function type, and a source/sink function type. For example, a camera may be considered as the source function type corresponding to the video and a display device may be considered as the sink function type. Also, each of the plurality of VDDs may include at least one information format which is used for respectively implementing the plurality of specific functions. For example, the video may include an information format such as a BMP, and a JPG, among others. The audio may include the information format such as a WAV, and a PCM among others. According to an exemplary embodiment of the present invention, the plurality of specific functions of an identical information type facilitates the user's ability to simply combine each of the plurality of specific functions of the devices in any status by supporting at least one common information format.

Figure 8:
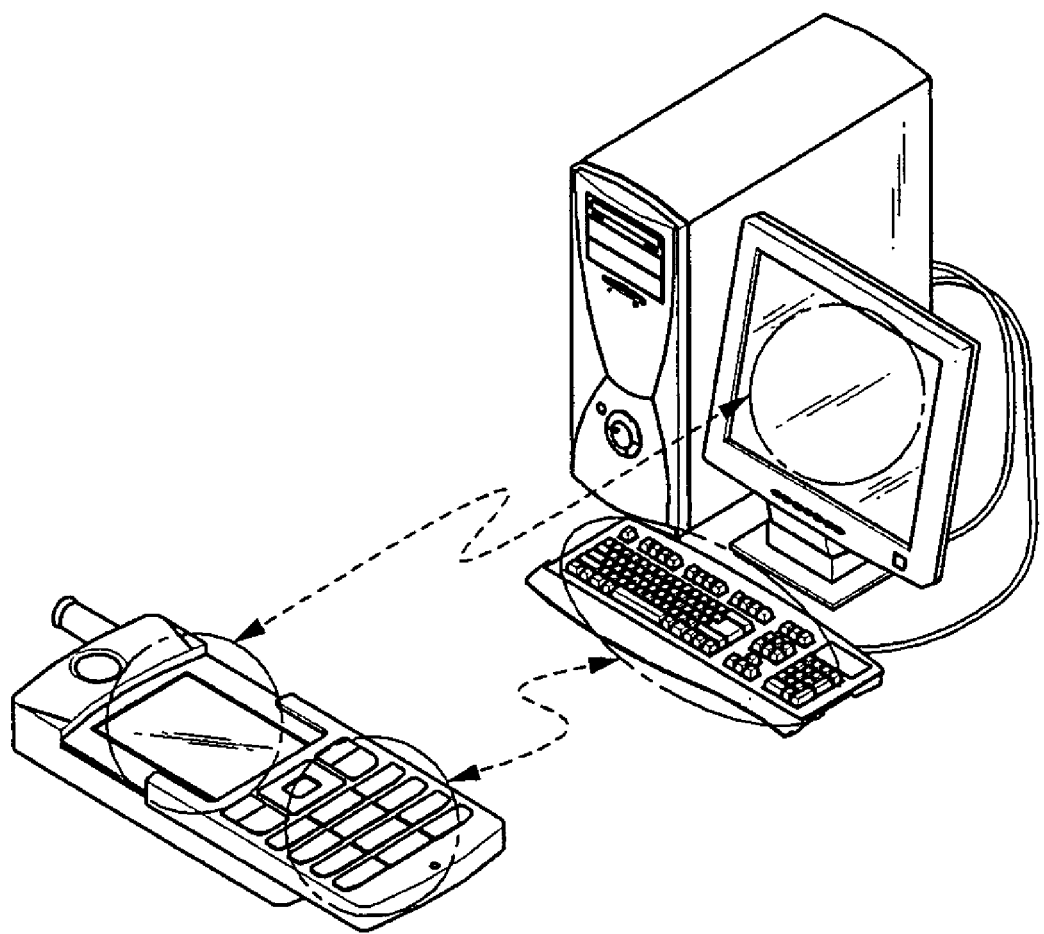
FIG. 8 is a diagram illustrating an exemplary embodiment using a method of configuring a VD of FIG. 2.

FIG. 8 is a diagram illustrating an exemplary embodiment of the present invention using a method of configuring a VD of FIG. 2.

Referring to FIG. 8, when the VD is configured according to the method of configuring the VD of an exemplary embodiment of the present invention, convenience may be gained by using a large-sized display device included in a desktop computer located nearby, and a keyboard of the desktop computer. It is convenient to use the large-sized display device and the keyboard of the desktop instead of a small-sized display device and a keypad when the user utilizes the contents or inputs with the user's device, such as the mobile terminal. Specifically, the user performs a user input such as inputting a message of a short message service (SMS) by using the keyboard connected with the desktop computer instead of the keypad in the mobile terminal. The user is then able to input information such as that found in an address book more conveniently. Also, the service satisfying the user's needs may be provided by outputting image contents, which is normally output via the small-sized display device included in the mobile terminal, via the large-sized display device included in the desktop computer. Even though the mobile terminal may be located in a bag, clothing, etc., and is out of sight, the user may identify the received message by using the display device and the keyboard in the used desktop computer, and transmit a response message in respect to the received message by making the response message.

Figure 9:
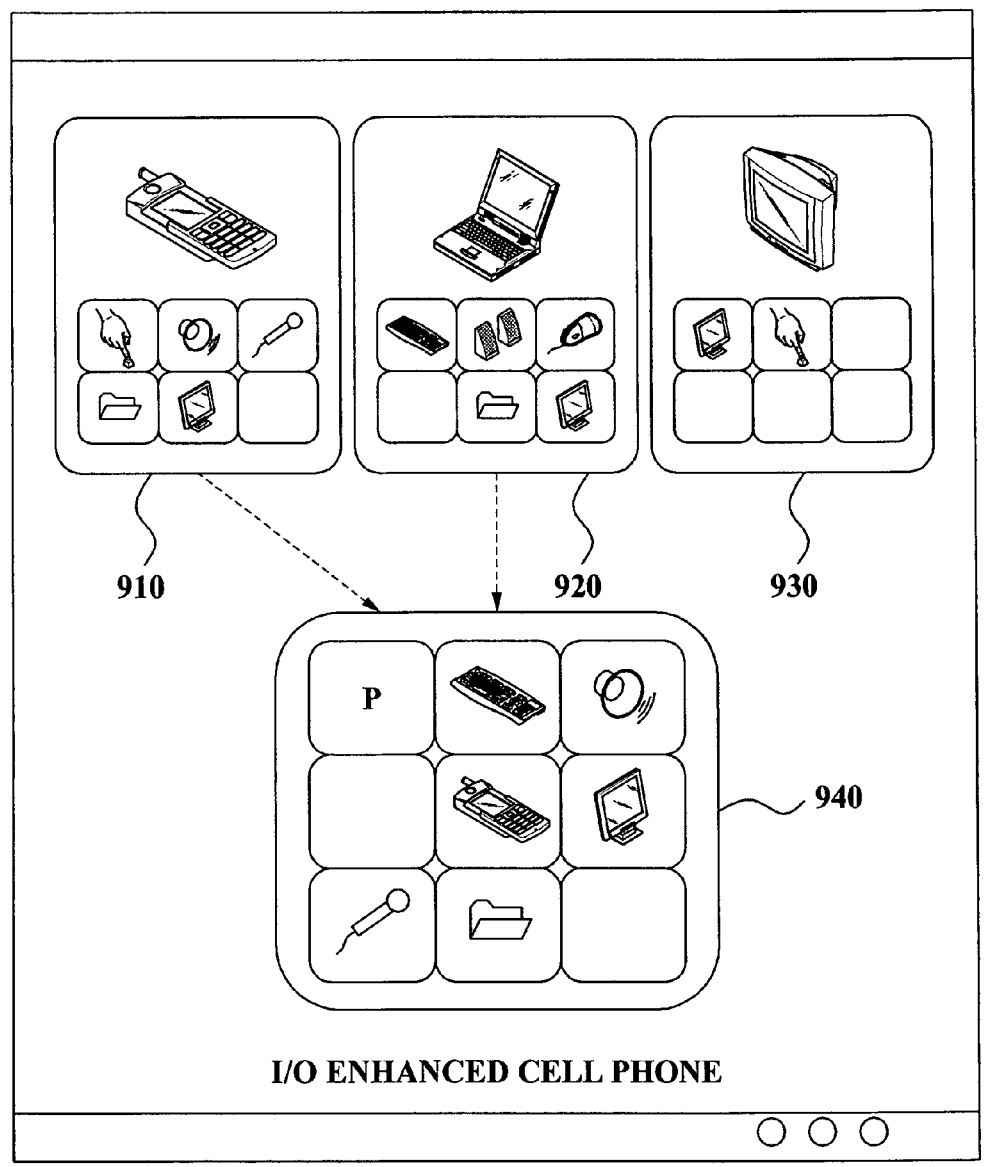
FIG. 9 is a diagram illustrating an exemplary embodiment of a method of selecting a plurality of VDDs required for a service of FIG. 2.

FIG. 9 is a diagram illustrating an exemplary embodiment of the present invention. A plurality of VDDs required for a service of FIG. 2 is selected.

As illustrated in FIG. 9, the method of configuring the VD may provide the user with a user interface screen selecting the VDD required for the service. According to the method of configuring the VD, a plurality of devices such as a mobile terminal 910, a notebook 920 and a digital television 930 located nearby, may be sensed. The VDD corresponding to each of the plurality of specific functions of the sensed devices may be indicated in the form of an icon. Specifically, the mobile terminal 910 may include the specific function of a keyboard, a speaker, a microphone, a storage unit, and a display device. The notebook 920 may also include the specific function of the keyboard, the speaker, a mouse, the storage, and the display device. Also, the digital television 930 may include the specific function of the display device and the keyboard. According to the method of configuring the VD, the user may input the VDD corresponding to each of the plurality of specific functions of the mobile terminal 910, and the VDD corresponding to each of the plurality of specific functions of the keyboard and the display device in the notebook 920. Accordingly, the VDDs configuring the VD 940 required for the service may be selected.

Figure 10:
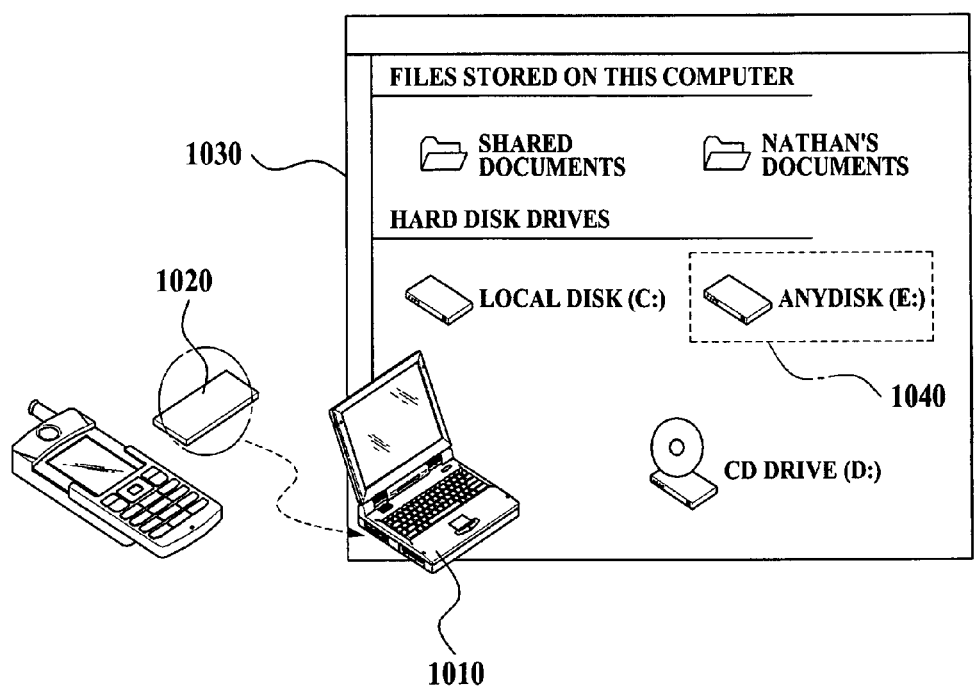
FIG. 10 is a diagram illustrating another exemplary embodiment using a method of configuring a VD of FIG. 2.

FIG. 10 is a diagram illustrating another exemplary embodiment of the present invention using a method of configuring a VD of FIG. 2.

Referring to FIG. 10, the method of configuring the VD may configure a new VD by combining a notebook 1010 and a built-in storage 1020 of a portable device constantly carried such as a mobile terminal.

The method of configuring the VD identifies a plurality of VDDs corresponding to a plurality of specific functions of a first device, such as a notebook 1010, respectively. The method of configuring the VD also identifies a second device, such as the mobile device and identifies a plurality of VDDs corresponding to the plurality of specific functions of the second device respectively. VDDs that correspond to the plurality of specific functions of the notebook are selected. A VDD is selected that corresponds to the storage 1020 in the portable device to configure the VD and configures the VD with the selected plurality of VDDs. Specifically, the VD may be configured to use the plurality of specific functions of the notebook 1010 and the storage 1020 of the portable device. For example, the storage 1020 of the portable device may be indicated in a new hard disk drive 1040 or a folder 1030 in the detector in the notebook, and the user may use the storage 1020 of the portable device similar to a general storage folder. The VD may also be configured by combining the storage of the portable device with any one of a notebook, a desktop computer, a digital computer and a printer. According to an exemplary embodiment of the present invention, the user may use the storage of the portable device in a disk which is constantly accessible anywhere.

Figure 11:
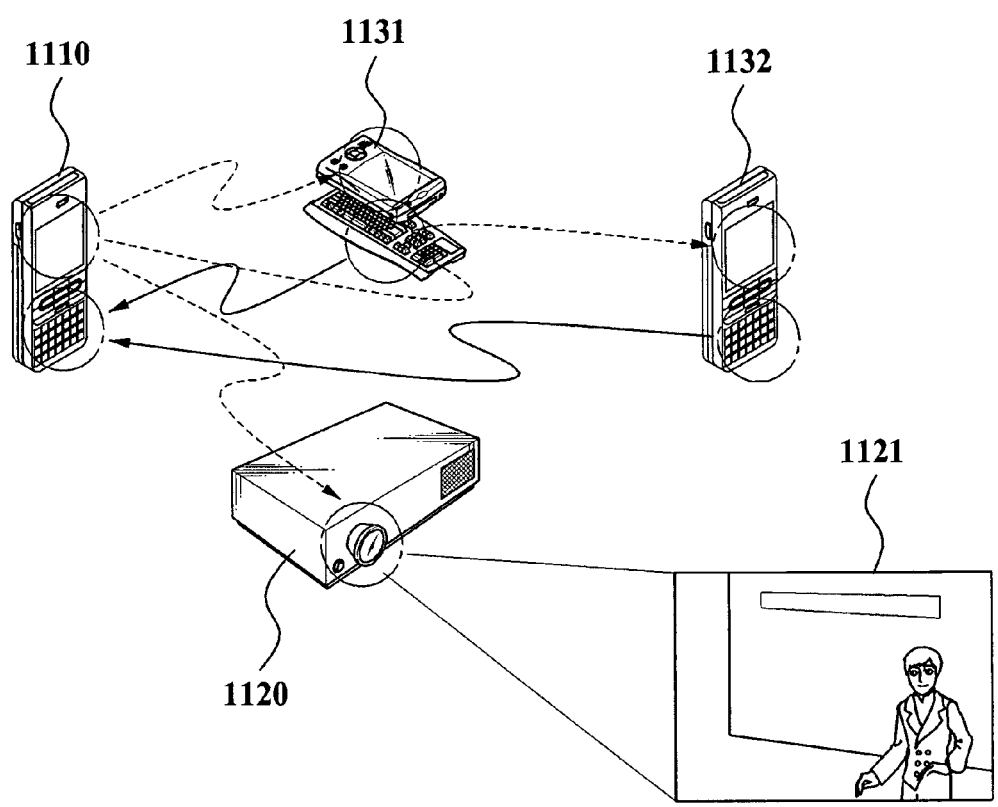
FIG. 11 is a diagram illustrating still another exemplary embodiment using a method of configuring a VD of FIG. 2.

FIG. 11 is a diagram illustrating another exemplary embodiment of the present invention using a method of configuring a VD of FIG. 2.

According to an exemplary embodiment of the present invention as illustrated in FIG. 11, the VD is configured when a presenter makes a presentation to an audience in a conference room, an auditorium, and the like, by using a portable device 1110 and a connected projector 1120. According to an exemplary implementation, the presenter makes the presentation using the portable device 1110 and the projector 1 120. The audience views the presentation material of the presenter on a large screen 1121 with a projection from the projector 1120. The presenter may arrange the presentation material on the presenter's own portable devices 1131 and 1132. According to an exemplary implementation, the presentation material may also be displayed in the display device in the presenter's portable device 1110, on the display device in the audience's portable devices 1131 and 1132 by configuring the VD between the presenter's portable device and the audience's portable device according to the method of configuring the VD of the present invention. Also, an input operation of the presenter's portable device 1110 may be controlled by the keyboard of the portable devices 1131 and 1132. Similarly, audience members, located in an area where a view of the projection on the large screen 1121 is obstructed, may easily verify the presentation material by verifying the presenter's presentation material via the portable devices 1131 and 1132, by jumping to a certain page of the presentation material to ask a question of the presenter, or by changing the presentation material. Specifically, when the input operation of the presenter's portable device 1110 is controlled with the keyboard in the audience members' portable devices 1131 and 1132, and documentation is jointly made, the method of configuring the VD may be more useful.

Figure 12:
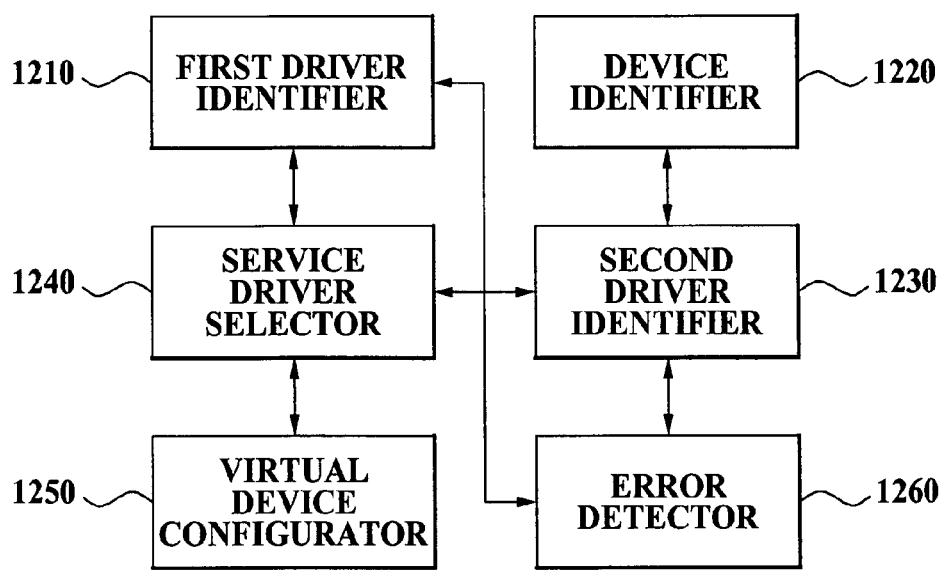
FIG. 12 is a block diagram illustrating a system of configuring a VD according to an exemplary embodiment of the present invention.

FIG. 12 is a block diagram illustrating a system of configuring a VD 1100 according to an exemplary embodiment of the present invention.

Referring to FIG. 12, a system of configuring a VD 1200 includes a first driver identifier 1210, a device identifier 1220, a second driver identifier 1230, a service driver selector 1240, a VD configurator 1250 and an error detector 1260.

The first driver identifier 1210 identifies a plurality of VDDs corresponding to a plurality of specific functions of a first device respectively. The plurality of specific functions of the first device is divided into the plurality of specific functions based on the type of contents processed in a device. For example, the plurality of specific functions may be divided into types of contents such as a video content, an audio, a text, a pointing, a storage unit, and a network, among others. The plurality of VDDs may correspond to each of the plurality of specific functions that is divided, and provides an interface with each of the plurality of specific functions of the device.

The plurality of VDDs may include at least one information format which is used for respectively implementing the plurality of specific functions. For example, the plurality of VDDs may include a BMP or a JPG as an information format used in implementing the plurality of specific functions, such as a video, and a WAV, a PCM, as the information format used in implementing an audio.

Also, as another example, each of the plurality of VDDs may correspond to a source function type or a sink function type.

The device identifier 1220 identifies the second device. The first device and the second device of the present invention may include at least one communication module, and each of the communication modules may include a wireless communication module such as a Zigbee module, a Bluetooth module, a WLAN module, a WiBro module, or a CDMA module,. The communication modules may also include a wired communication module such as an Ethernet module, and an EEEE 1394 module, among others. For example, the device identifier 1220 may transmit a device search query to a corresponding area in a broadcast method to identify all second devices located in the corresponding area via the communication module, and identify the second device by receiving a response signal from the second device located in the corresponding area.

The second driver identifier 1230 identifies a plurality of VDDs corresponding to the plurality of specific functions of the second device respectively.

The service driver selector 1240 selects a plurality of VDDs required for a service. The selection is made from the plurality of VDDs corresponding to the plurality of specific functions of the first device and the plurality of VDDs corresponding to the plurality of specific functions of the second device.

According to an exemplary implementation, the service driver selector 1240 is input by selecting the plurality of VDDs required for the service desired by the user, from the plurality of VDDs corresponding to the plurality of specific functions of the first device and the plurality of VDDs corresponding to the plurality of specific functions of the second device. The service driver selector 1140 may also provide a message informing the user of an overlapping input when the VDD input by the user is overlapping.

As another example, the service driver selector 1240 may select the plurality of VDDs required for the service according to a user's usage pattern record. The user's usage pattern record may correspond to a pattern record about the VD required for the service that the user previously selected and configured. The service driver selector 1240 may also select the plurality of VDDs corresponding to the VD generally configured according to the usage pattern record.

According to an exemplary embodiment of the present invention, the service driver selector 1240 may select the plurality of VDDs by providing the user with a pattern list according to the usage pattern record, and the user inputting any one of pattern lists.

The VD configurator 1250 configures the VD with the plurality of VDDs required for the service. According to an exemplary implementation, the VD configurator 1250 may transmit a query requiring a response concerning whether the VD may be configured with the device corresponding to each of the selected plurality of VDDs, receive a response message from the device corresponding to each of the selected plurality of VDDs, and thereby configure the VD with the plurality of VDDs required for the service.

The error detector 1260 may detect the occurrence of an error in a VDD when the error occurs while implementing the service using the VD. The VD configurator 1250 may reconfigure the VD with another VDD to replace a specific function corresponding to the detected VDD where the error occurs. For example, when the specific function corresponding to the VDD where the error occurs corresponds to a display device of a notebook, the method of configuring the VD may reconfigure the VD by replacing the VDD corresponding to the display device of the notebook with the VDD corresponding to the display device of a digital television.

Figure 13:
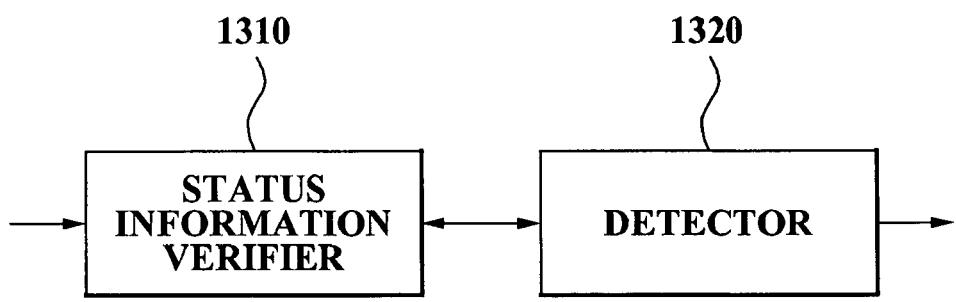
FIG. 13 is a block diagram illustrating an exemplary embodiment of an error detector of FIG. 12.

FIG. 13 is a block diagram illustrating an exemplary embodiment of an error detector of FIG. 12.

Referring to FIG. 13, the error detector 1260 includes a status information verifier 1310 and a detector 130.

The status information verifier 1310 may verify status information about the plurality of VDDs at predetermined intervals. Also, as an example, the status information verifier 1310 may receive the status information from a device corresponding to each of the plurality of VDDs at predetermined intervals.

The detector 1320 may detect the VDD where the error occurs with reference to the status information.

Since contents that are not described in the device illustrated in FIG. 12 are similar to the description above with regards to FIGS. 1 through 11, a detailed description thereof is omitted.

The present invention can also be embodied as computer-readable codes on computer-readable media including program instructions to implement various operations embodied by a computer. The media may also include, alone or in combination with the program instructions, data files, and data structures, among others. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher layer code that may be executed by the computer using an interpreter. The described hardware devices may be configured to act as one or more software modules in order to perform the operations of the above-described embodiments of the present invention.

According to the exemplary embodiments of the present invention, it is possible to efficiently use a resource of devices by combining a diverse plurality of devices, thereby configuring a VD and using a configured VD.

Also, according to the exemplary embodiments of the present invention, it is possible for a user to use a device more conveniently by using a VD configured by combining a diverse plurality of devices.

According to other exemplary embodiments of the present invention, it is possible for a user to use a device more conveniently based on the user's objectives by separating and combining a specific function of a plurality of devices with the specific function of another plurality of devices.

According to yet another exemplary embodiment of the present invention, it is possible to enhance compatibility between devices due to an information format used for implementing a specific function of a device.

Also, according to the exemplary embodiments of the present invention, it is possible for a user to conveniently configure a VD by using a user's usage pattern record.

While the present invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of configuring a virtual device, the method comprising:
   identifying a first plurality of virtual device drivers corresponding to a first plurality of specific functions of a first device, respectively;
   identifying a second device;
   identifying a second plurality of virtual device drivers corresponding to a second plurality of specific functions of the second device, respectively;
   selecting a third plurality of virtual device drivers required for a service, from the first plurality of virtual device drivers corresponding to the first plurality of specific functions of the first device and the second plurality of virtual device drivers corresponding to the second plurality of specific functions of the second device; and
   configuring a virtual device with the third plurality of virtual device drivers required for the service,
   wherein each of the third plurality of virtual device drivers comprises at least one common information format used for respectively implementing the first and second plurality of specific functions,
   wherein the identifying of the first plurality of virtual device drivers, the identifying of the second device, the identifying of the second plurality of virtual device drivers, the selecting of the third plurality of virtual device drivers and the configuring of the virtual device each are performed by a processor,
   wherein the selecting comprises selecting the third plurality of virtual device drivers required for the service according to a user's usage pattern record, and
   wherein the usage pattern record corresponds to a pattern record about the virtual device required for the service that the user previously selected and configured.

2. The method of claim 1, wherein each of the first plurality of virtual device drivers, the second plurality of virtual device drivers and the third plurality of virtual device drivers corresponds to at least one of a source function type and a sink function type.

3. The method of claim 1, further comprising:
   detecting a virtual device driver where an error occurs when the error occurs when implementing the service using the virtual device; and
   reconfiguring the virtual device with another virtual device driver to replace a specific function corresponding to the detected virtual device driver where the error occurs.

4. The method of claim 3, wherein the detecting comprises:
   verifying status information of the third plurality of virtual device drivers at certain intervals; and
   detecting the virtual device driver where the error occurs with reference to the status information.

5. The method of claim 3, wherein the detecting comprises:
   receiving status information from the virtual device corresponding to each of the third plurality of virtual device drivers at certain intervals; and
   detecting the virtual device driver where the error occurs with reference to the status information.

6. The method of claim 1, wherein the at least one common information format includes at least one of a bitmap (BMP) format, a Joint Photographic Experts Group (JPG) format, a Waveform audio (WAV) format and a pulse-code modulation (PCM) format.

7. A non-transitory computer-readable recording medium storing a program, the program when executed by a processor causes the processor to implement a method comprising:
   identifying a first plurality of virtual device drivers corresponding to a first plurality of specific functions of a first device, respectively;
   identifying a second device;
   identifying a second plurality of virtual device drivers corresponding to a second plurality of specific functions of the second device, respectively;
   selecting a third plurality of virtual device drivers required for a service, from the first plurality of virtual device drivers corresponding to the first plurality of specific functions of the first device and the second plurality of virtual device drivers corresponding to the second plurality of specific functions of the second device; and
   configuring a virtual device with the third plurality of virtual device drivers required for the service,
   wherein each of the third plurality of virtual device drivers comprises at least one common information format used for respectively implementing the first and second plurality of specific functions,
   wherein the identifying of the first plurality of virtual device drivers, the identifying of the second device, the identifying of the second plurality of virtual device drivers, the selecting of the third plurality of virtual device drivers and the configuring of the virtual device each are performed by a processor,
   wherein the selecting comprises selecting the third plurality of virtual device drivers required for the service according to a user's usage pattern record, and
   wherein the usage pattern record corresponds to a pattern record about the virtual device required for the service that the user previously selected and configured.

8. A system of configuring a virtual device, the system comprising:
   a processor;
   a first driver identifier for identifying a first plurality of virtual device drivers corresponding to a first plurality of specific functions of a first device, respectively;
   a device identifier for identifying a second device;
   a second driver identifier for identifying a second plurality of virtual device drivers corresponding to a second plurality of specific functions of the second device, respectively;
   a service driver selector for selecting a third plurality of virtual device drivers required for a service, from the first plurality of virtual device drivers corresponding to the first plurality of specific functions of the first device and the second plurality of virtual device drivers corresponding to the second plurality of specific functions of the second device; and
   a virtual device configurator for configuring the virtual device with the third plurality of virtual device drivers required for the service,
   wherein each of the third plurality of virtual device drivers comprises at least one common information format used for respectively implementing the first and second plurality of I specific functions, wherein the first driver identifier, the device identifier, the second driver identifier, the service driver selector and the virtual device configurator each are implemented by the processor, wherein the service driver selector selects the third plurality of virtual device drivers required for the service according to a user's usage pattern record, and wherein the usage pattern record corresponds to a pattern record about the virtual device required for the service that the user previously selected and configured.

9. The system of claim 8, wherein each of the first plurality of virtual device drivers, the second plurality of virtual device drivers and the third plurality of virtual drivers corresponds to at least one of a source function type and a sink function type.

10. The system of claim 8, further comprising:
an error detector for detecting a virtual device driver where an error occurs when the error occurs when implementing the service using the virtual device,
wherein the virtual device configurator reconfigures the virtual device with another virtual device driver to replace a specific function corresponding to the detected virtual device driver where the error occurs.

11. The system of claim 10, wherein the error detector comprises:
a status information verifier for verifying status information about the third plurality of virtual device drivers at certain intervals; and
a detector for detecting the virtual device driver where the error occurs with reference to the status information.

12. The system of claim 10, wherein the error detector comprises:
a status information verifier for receiving status information from the virtual device corresponding to each of the plurality of virtual device drivers at certain intervals; and
a detector for detecting the virtual device driver where the error occurs with reference to the status information.

13. The system of claim 8, wherein the at least one common information format includes at least one of a bitmap (BMP) format, a Joint Photographic Experts Group (JPG) format, a Waveform audio (WAV) format and a pulse-code modulation (PCM) format.

* * * * *